July 14, 1931.  L. E. BALTZLEY  1,814,464
MACHINE FOR SNELLING FISHHOOKS
Filed Jan. 14, 1930   3 Sheets-Sheet 1
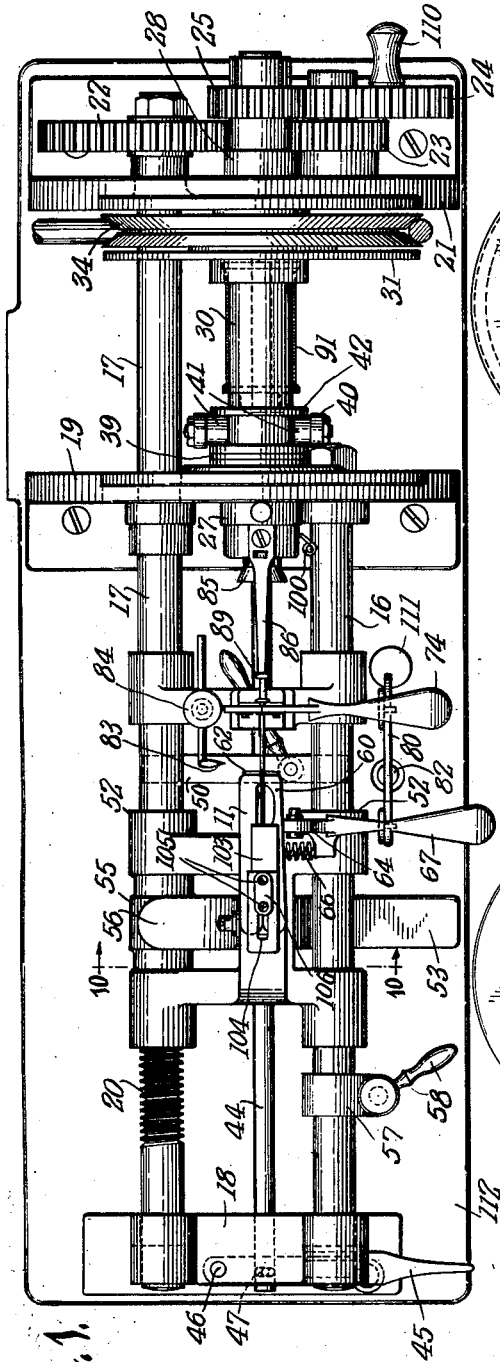
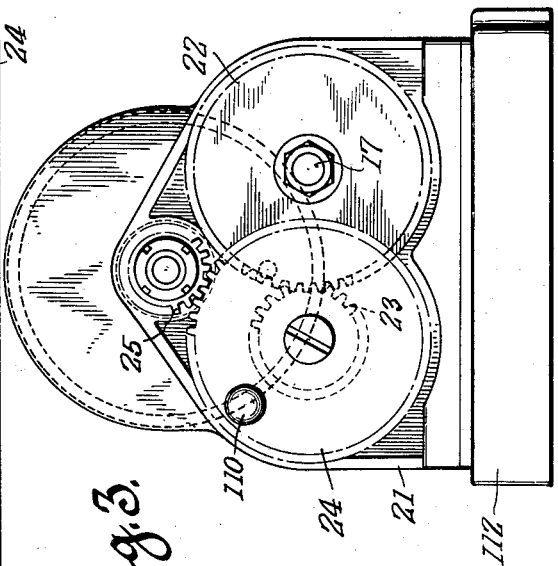
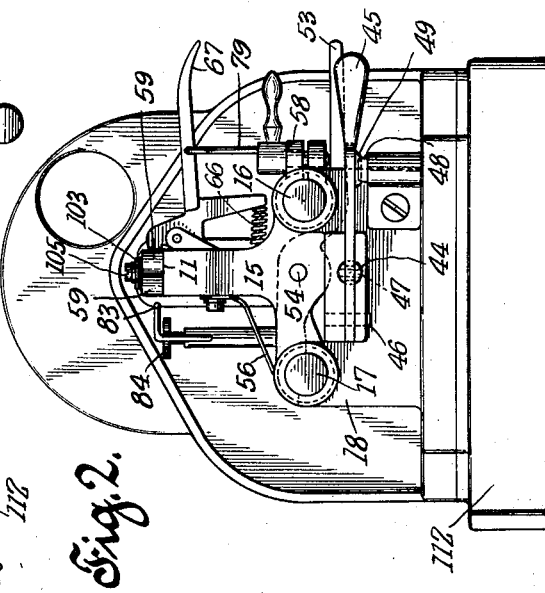
INVENTOR
Louis E. Baltzley
BY
ATTORNEY

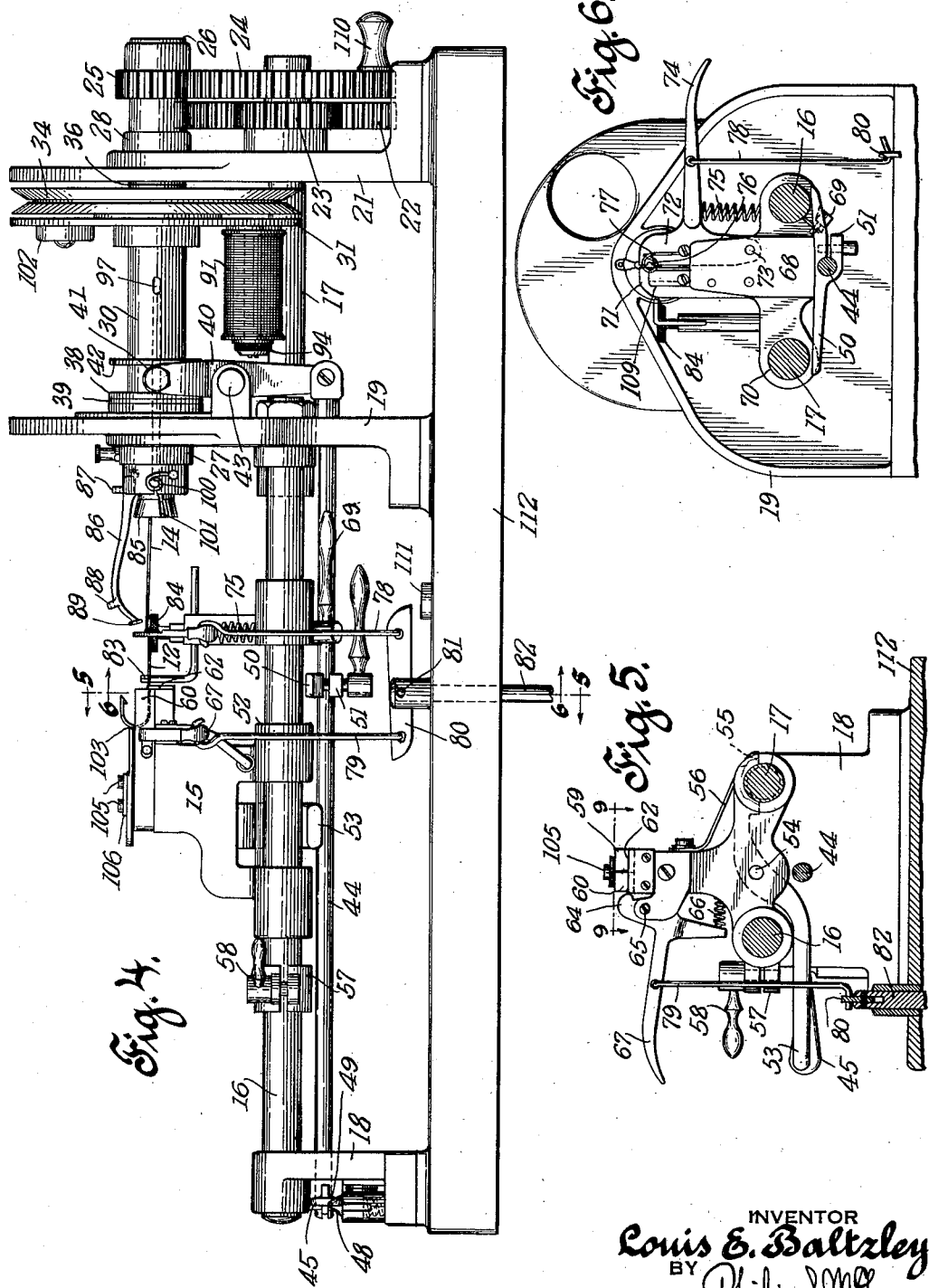

July 14, 1931.   L. E. BALTZLEY   1,814,464
MACHINE FOR SNELLING FISHHOOKS
Filed Jan. 14, 1930   3 Sheets-Sheet 3
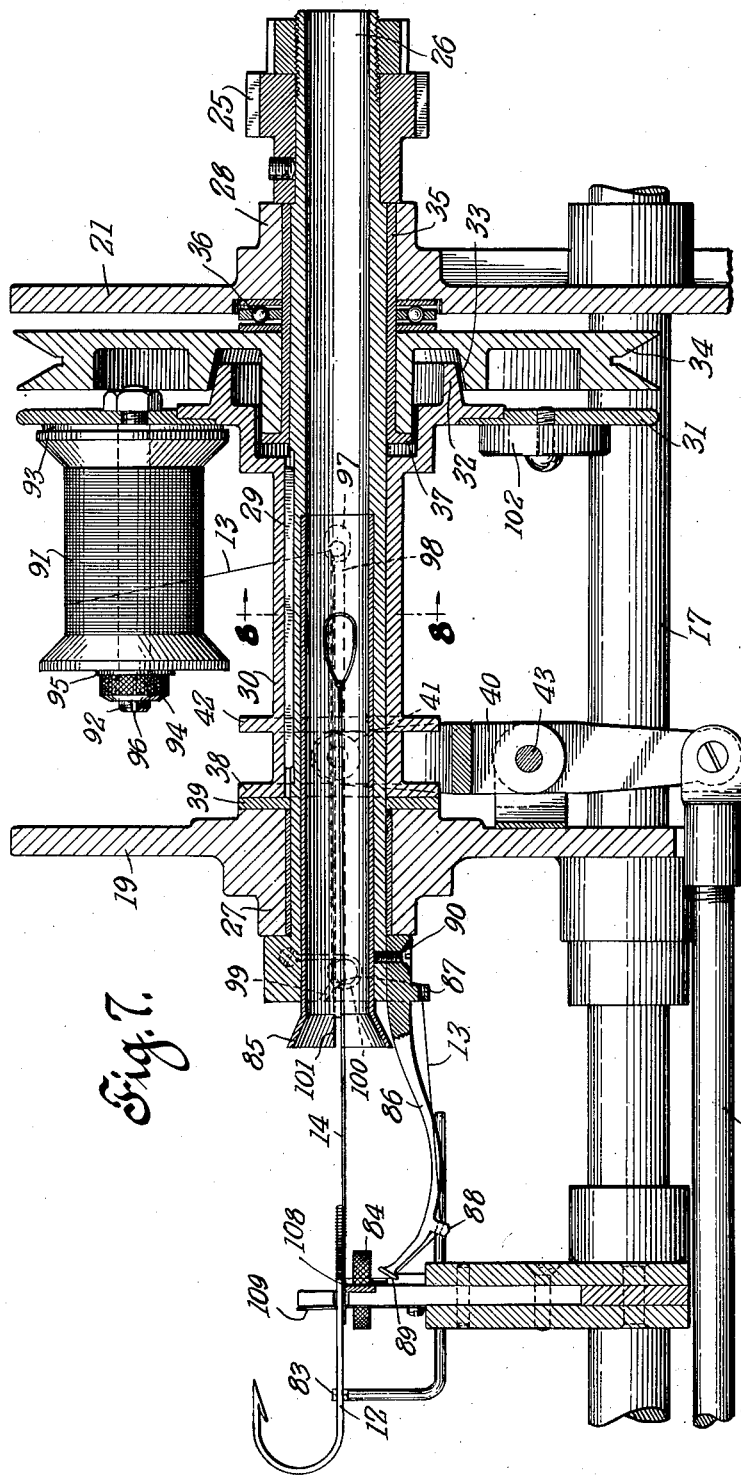
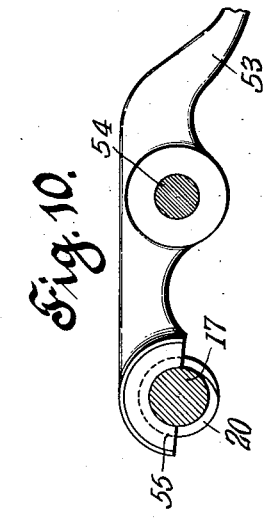
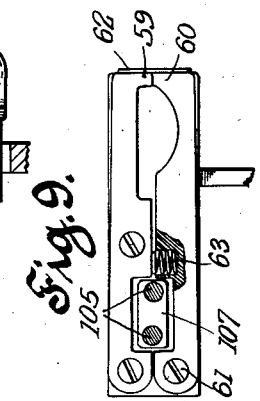
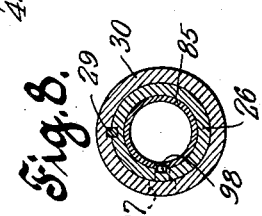
INVENTOR
Louis E. Baltzley
BY
Philip S. McLean
ATTORNEY Patented July 14, 1931

1,814,464

UNITED STATES PATENT OFFICE

LOUIS E. BALTZLEY, OF GLEN RIDGE, NEW JERSEY

MACHINE FOR SNELLING FISHHOOKS

Application filed January 14, 1930. Serial No. 420,653.

This invention relates to the snelling of fish hooks.

Special objects of the invention are to provide a machine for attaching the "guts" or snells to the shanks of the hooks, which will be as nearly automatic as possible in its operation, requiring no specially skilled labor and which will operate quickly and effectively to secure the snells to the hooks.

Other objects of the invention are to provide a machine of the character referred to, which can be readily adjusted to handle different sizes or styles of hooks and snells, different lengths of "wrap" or other variables required by the trade.

The special novel features of the invention and the novel combinations and relations of parts by which the foregoing and other desirable objects are attained are set forth in the following specification and illustrated in the accompanying drawings forming part of said specification.

The drawings are primarily for purposes of disclosure, so it will be understood the physical structure of the invention may be modified without departure from the true spirit and broad scope of the invention.

Fig. 1 is a top plan view of the machine; Figs. 2 and 3 are left and right hand end views respectively; Fig. 4 is a front elevation of the machine.

Figs. 5 and 6 are cross-sectional views as on the plane of lines 5—5 and 6—6 respectively of Fig. 4; Fig. 7 is a broken enlarged part longitudinal sectional view of the winding head, hook chuck, steady rest and associated parts; Fig. 8 is a cross-sectional view of the main shaft and hub of the winder substantially on the plane of line 8—8 of Fig. 7; Fig. 9 is an enlarged broken part sectional plan view of the hook chuck as on substantially the plane of line 9—9 of Fig. 5; Fig. 10 is a broken part sectional detail of the screw feed for the hook chuck.

In the operation of the machine herein disclosed, a hook is placed in a chuck 11 with its shank protruding as shown at 12 in Fig. 7 and as this chuck travels longitudinally of the machine, a rotating winder wraps a thread 13 about the overlapped portions of the hook shank and the gut or snell 14.

Figs. 1, 4 and 5 in particular show how the hook chuck is mounted on a carriage 15 slidable on shafts 16, 17. Shaft 16 is a stationary member supported at its ends in the brackets or head frames 18, 19 of the machine. This shaft serves simply as a guide and support for the sliding carriage and other parts. Shaft 17 is mounted for rotation in the frames 18, 19, and is provided with a screw threaded portion 20 designed to effect the feed of the carriage.

For drive purposes, the screw feed shaft 17 is extended on beyond the intermediate frame 19 and through an end frame 21, it having a journal bearing in the latter and carrying a gear 22 meshed by a pinion 23 on the face of a gear 24 in mesh with a pinion 25 fixed on the outer end of the main shaft 26. This main shaft is journalled at 27, 28 in the intermediate and end frames 19 and 21 and is shown as hollow, Fig. 7 to serve as a loose guide for the loop end of the gut.

Slidably keyed upon the hollow shaft 26 as by means of a spline or feather 29 is the hub 30 of a winding head 31. This winding head has a limited sliding movement on the shaft between the bearing brackets 19, 21, sufficient to effect a clutching and unclutching action. Specifically, the clutch is shown in the present illustration as made up of cooperating cone members 32, 33, on the opposing faces of the winding head 31 and the concentrically supported drive pulley 34. This drive plley is shown as rotatably supported on the outside of a journal bushing 35, which forms the actual bearing for the shaft 26 in the frame bracket 21. A thrust bearing is shown provided at 36 to carry the thrust load of the engaged clutch members and a flange 37 is shown provided at the end of the bushing to serve as a stop insuring positive separation of the clutch members.

Positive stoppage of the winder at the end of each winding operation is effected in the illustration by causing the flange 38 on the end of the winder hub to engage a relatively stationary friction disc 39 at the end of the unclutching movement.

The clutching and unclutching action is effected in the machine shown by a shipper fork 40 carrying rolls 41 engaging between the flanges 38, 42 on the winder hub, said fork being pivotally mounted intermediate its ends at 43 and having its lower end coupled to a shift rod 44. This shift rod may be thrown in opposite directions, in the illustration by a hand lever 45, Figs. 1 and 2, projecting at the front of the machine, pivoted on the frame at its inner end at 46 and having the rod connected to an intermediate portion of the same by a pin and slot connection 47.

To snap the clutch in by one movement and the brake on by the opposite movement, a spring pressed plunger 48 is shown in Figs. 2 and 4, having a pointed upper end engaging a pointed edge or cam surface 49 on the lower side of the lever. With this construction, it will be seen that the cam face on the lever will depress the cam edge of the plunger and that the plunger will snap over from one side to the other side of the cam ridge to throw the lever in the direction in which it is urged, thus effecting a quick, firm engagement of the clutch on the one hand or the quick release of the clutch and firm engagement of the brake for stopping the winder on the other hand.

To automatically shift the clutch and stop the winder at the end of a predetermined winding operation, a trip is provided in the illustration in the form of a cross bar 50, adjustably secured on the shift rod by a split clamp 51, Figs. 4 and 6, in position to be engaged by the shoulders 52 on the end of the sliding carriage 15. It will be evident, that by properly setting the trip 50, the clutch can be thrown out and the winder stopped at the end of any desired travel of the hook carrying carriage.

The carriage may be released from the feed screw and be slid back into the starting position, toward the left in Fig. 1 by means of a handle 53 projecting at the front of the machine, said handle being pivoted at 54 underneath the carriage and having a nut segment 55 in its inner end to match the feed screw. A spring 56 normally forces the nut end of this lever down into mesh with the feed screw, said spring yielding readily to downward pressure on the outer end of the lever.

The return or retractive movement of the carriage is fixed in the illustration by a stop 57 adjustably secured on the guide rod 16 by the split clamp 58.

The chuck for the hook consists of relatively movable jaws, one being shown as a stationary jaw 59 fixed on top of the carriage and the other as a movable jaw 60 pivoted at 61. The shank of the hook is caught between these two jaws resting on the edge of a gage 62. The movable jaw is thrust open by a spring 63, Fig. 9 and is forced closed by a lever 64 pivoted on the carriage at 65 and acted on by a jaw closing spring 66, Fig. 5. This lever is shown as having a forwardly projecting finger hold 67.

To steady and support the shank of the hook and the snell at the winding point, a steady rest is provided in the illustration in the form of a member 68, adjustably secured on the supporting rod 16 by the split clamp 69, Figs. 4 and 6, said member having a sleeve portion 70 loosely receiving the rotating shaft 17.

This steady rest is shown as having a fixed jaw 71 and a cooperating movable jaw 72 pivoted at 73, the latter having a handle extension 74 by which it may be opened against the tension of a closing spring 75, Fig. 6. The opposing faces of these jaws are shown as apertured at 76 to loosely receive the hook shank and the snell and a spring loop is illustrated at 77 in line with this guide aperture to assist in placing the snell when the steady rest jaw is opened.

To enable the quick opening of both the steady rest and the hook chuck, the jaw opening lever handles of these two devices are shown as connected by links 78, 79, with the opposite ends of a toggle lever 80 pivoted at 81 on the upper end of a pull link 82, which is connected with a foot pedal or other convenient operating means.

If desired, the jaw closing springs may be tensioned or the leverages be so arranged that one set of jaws, for instance, those at the steady rest, will open ahead of the other jaws, in this example, the hook closing jaws. Conversely with such an arrangement, one set of jaws, the hook jaws in the case considered, will close ahead of the other jaws, at the steady rest. This enables the operator to locate the hook in the hook chuck and permit those jaws to hold the hook in position while the steady rest is still in open condition ready to receive the snell. The usual method of locating the snell is to insert the loop end of the snell into the hollow of the drive shaft, then pass the opposite end through the spring guide loop 77, after which the steady rest jaws may be permitted to close, with the shank of the hook and the end of the snell lying in the guide aperture of the steady rest.

To properly gage the projecting portion of the snell, that is the part which overlies and is to be made fast to the hook shank, a gage finger 83 may be provided adjustably secured by screw 84 in the steady rest and showing at a quick glance the proper place to leave the snell in the steady rest.

The loop end of the snell is guided into the hollow end of the shaft in the illustration by a funnel 85, which is shown in Fig. 7 as a bushing driven into the left hand end of the shaft.

The thread or other fastening medium is wrapped about the overlapped guided portions of the hook and snell by a traveller shown in the form of an arched arm 86 fixed on the inner end of the main shaft and provided with thread loops 87, 88 and 89, the latter being approached relatively closely to the winding center as shown in Fig. 7. This traveller is shown as detachably secured on the shaft end at 90, enabling the quick replacement or substitution of different styles or sizes of travellers.

The thread is supplied in the present disclosure from a spool 91 mounted on a spindle 92 on the winder head 31 and tensioned against a friction washer 93 by a thumb nut 94. As shown in Fig. 7, a washer 95 is interposed between the tension adjusting thumb screw 94 and the adjacent head of the spool and the screw-threaded end of the spindle is split and spread as shown at 96 to yieldingly grip the screw and thereby retain the same in the position of desired thread tensioning adjustment.

From the spool, the thread is led through an opening 97 in the hollow shaft and thence along a passage 98 on the inside of said shaft but outside the inserted funnel bushing and through a transverse outlet passage 99 in the end of the shaft to a guide loop 100 adjacent the base loop 87 of the traveller. A slot 101 cut in the edge of the funnel in line with the longitudinal thread passage 98 is provided to facilitate the drawing out of the thread in the threading up operation. To counter-balance the weight of the spool on the winder head, a counter-balance weight 102 may be secured on said head substantially diametrically opposite the spool mount. If desired, a second spool may be mounted on the head at this point or additional spools may be carried by the head if it is desired to wrap the snell with a number instead of only with a single thread.

As an aid to properly placing the hook in the chuck, a gage 103, Figs. 1 and 2, may be adjustably secured in position overstanding the fixed and movable jaws of the chuck, said gage being shown as longitudinally slotted at 104 for the passage of screws 105, which secure the clamp plate 106 in holding position over the gage plate. To prevent this gage plate from interfering with the operation of the chuck, said gage plate may be supported on a spacing block 107, Fig. 9, high enough to hold the gage plate out of contact with the movable jaw 60 of the chuck. This permits the movable jaw to open and close without scraping against the overstanding gage plate, so that the action of the chuck is free and the gage plate is not disturbed or thrown out of adjustment by the continued operation of the chuck.

The fixed member 71 of the guide or steady rest is shown in Figs. 1, 4 and 7 as carrying a gage or rest 108 for positioning the hook and snell at the proper level or center in the guide opening of the steady rest. On the opposite face of the steady rest, there is shown a knife blade 109, which the operator may conveniently use for cutting the thread at the end of the winding operation.

In the usual operation of the machine, the hook carriage is thrown back by pressing handle 53 and shifting the carriage over to the left in Fig. 1 to the starting position determined by the adjustable stop 57. On depression of the foot pedal or other means for operating the steady rest and hook chuck, the steady rest and then the chuck will open up ready to receive the snell and hook. The shank of the hook is entered in the spring guide loop 77 and the body of the hook dropped into the chuck with the barb up as indicated in Figs. 4 and 7, being accurately located by the gage rest 62 at the front of the chuck and by the back gage 103, the latter determining the length of the projecting portion of the shank and hence the length of the wrap. The chuck may then be allowed to close on the hook by slightly releasing the pressure on the foot pedal, the steady rest still remaining open, because of the lighter closing spring on the same. The snell may then be located by slipping the loop end of the same up through the funnel into the open end of the arbor or main shaft and by inserting the cut end of the same through the spring guide loop 77 to a position in line with the snell gage 83. On removal of remaining pressure on the pedal the steady rest will close with the hook shank and overlying portion of the snell located freely in the guide passage of the steady rest. On throwing the hand lever 45 to the left in Figs. 1 and 4, the shipper fork 40, rocking to the right under the influence of the pull on shift rod 44 in Fig. 7 will disengage the winder hub from the brake 39 and engage the clutch elements 32, 33, whereupon the winder will be driven by the constantly running pulley 34. Before throwing in the clutch, the thread may be caught about the snell and hook shank by a suitable hitch or knot or the end of the thread may be simply held over these parts, so that with the first turn one wrap will be laid over the other, so as to immediately take hold. As the winding proceeds, the carriage advances and the snell being now attached to the hook shank by the accumulating turns of threads slides along through the steady rest with the shank rigidly held in the hook chuck, the looped end of the snell simply riding up further into the hollow shaft during this winding on operation.

When the length of wind determined by the setting of the parts is completed, the shoulders 52 on the carriage engage the trip bar 50 on the shift rod 44, Figs. 1 and 4, and force the shift rod to the right in these views, causing the shipper fork to unclutch the winder from the drive pulley and to carry it to the left over into engagement with the friction brake 39, which brings the winder and carriage feed to an immediate stop. This positive quick stop is assured by the spring detent cam 48, which acting against the cam element 49 on the hand lever 45, Figs. 1 and 9, snaps said lever over as soon as the dead center position of the cam parts 48, 49 is reached.

Upon the completion of the carriage movement and stoppage of the winding head, the foot pedal may be depressed to open up the steady rest and hook chuck, whereupon the hook with its snell attached may be simply lifted out of the chuck, the snell coming freely out of the hollow guide shaft and open steady rest and the loop on the snell sliding out freely through the spring guide loop 77. As the snelled hook is withdrawn, the thread may be conveniently cut over the edge of the knife 109 on the back of the steady rest.

The swinging link toggle connections at 78, 79, 80 in Fig. 4, between the steady rest and hook chuck and the pull rod 82 of the foot pedal enable operation of these parts in variously adjusted positions of the steady rest and sliding chuck.

To facilitate preliminary setting up or adjustment of the machine, the intermediate large gear 24 is shown equipped with a crank handle 110 by which this gear may be turned independently of the power drive.

The placing of the parts in the machine and the removal of the finished article are both simple easy operations, the machine is quickly and easily started and stopped by the snap cam handle lever 45, the thread is applied with a firm even wrap and this winding on operation may be effected at high speed. The tension of the wrap is easily regulated and the machine is adjustable in other respects to adapt it to various kinds and sizes of hooks, snells and wrapping material.

To limit the extent of opening of the stead rest, the tip of the toggle lever 80 may engage a stop lug 111 on the bed 112 of the machine, Fig. 4. When the end of the toggle strikes this stop, the steady rest will open no further and continued pull on the pedal rod 82 thereupon will of necessity rock the further end of the toggle pulling down on the link 79 to open the hook chuck.

What is claimed is:

1. A machine for snelling fish hooks, comprising means for holding a fish hook and a snell non-rotatively in a properly related overlapping relation and a rotating winder for applying a wrapping about the overlapping portions of the thus related hook and snell.

2. A machine for snelling fish hooks, comprising means for holding a fish hook and a snell non-rotatively in a properly related over lapping relation, a rotating winder for applying a wrapping about the overlapping portions of the thus related hook and snell and means for automatically stopping the winder at the completion of a predetermined length of winding.

3. A machine for snelling fish hooks, comprising means for holding a fish hook and a snell non-rotatively in a properly related over lapping relation, a rotating winder for applying a wrapping about the overlapping portions of the thus related hook and snell, gage devices for locating the hook and snell for a predetermined length of winding and means for automatically stopping the winding operation when said predetermined length of winding has been completed.

4. A machine for snelling fish hooks, comprising a hook chuck and a winder head relatively movable toward and away from each other, means for guiding a snell in overlapped relation to the shank of a hook held in the chuck means for effecting relative advancing movement of the chuck and winder head and means for automatically stopping the relative advance of the chuck and winder head upon completion of a predetermined length of winding.

5. A machine for snelling fish hooks, comprising a winder having a rotating traveller, a hook holding device having an advancing movement toward said traveller and means for locating a snell with respect to the shank of a hook positioned by the holder adjacent the winding on point of the traveller.

6. In a machine of the character disclosed, a winder having a rotating traveller, a steady rest adjacent the winding on point of the traveller and a hook holding chuck having a movement toward and away from said steady rest.

7. In a machine of the character disclosed, a sliding carriage, a fish hook holding chuck on said carriage, means for holding a snell in associated relation to the shank of a hook carried by said chuck, means for imparting an automatic feeding movement to said sliding carriage and means for applying a securing wrapping about said associated hook shank and snell.

8. In combination, a holder for releasably holding a fish hook with a predetermined portion of the shank protruding, a winder having a traveller for wrapping a fastening strand about the protruding shank of a hook retained in the holder and means for automatically effecting a predetermined relative travel of the holder and winder to thereby apply a predetermined length of wrapping.

9. In combination, a holder for releasably holding a fish hook with a predetermined portion of the shank protruding, a winder having a traveller for wrapping a fastening strand about the protruding shank of a hook retained in the holder, means for automatically effecting a predetermined relative travel of the holder and winder to thereby apply a predetermined length of wrapping and means for guiding a snell substantially at the winding on point of the traveller.

10. A snelling machine, comprising a guide for the looped end of a snell and a guide for the cut end of the snell, means for holding a fish hook with a shank portion of the same in overlapping relation to the cut end of the snell, a winder for wrapping a binding strand about the overlapping portions of the hook shank and snell and traversing mechanism for carrying the winding along the shank of the hook.

11. A snelling machine, comprising a winder, hook and snell holding means, means for effecting relative traverse of said holding means and winder and means for stopping the winding action at the end of a predetermined traverse movement.

12. A machine of the character disclosed, comprising a hollow shaft adapted to receive the looped end of a snell, a traveller carried by said shaft for wrapping a strand about a thus positioned snell, a hook holder for supporting a hook with its shank in line with said positioned snell and means for effecting traverse of said hook holder and traveller to carry the winding along the shank of the hook in the holder.

13. In combination, a hollow shaft adapted to receive and guide the looped end of a snell, a drive member rotatable freely about said shaft, a winder head slidingly keyed on said shaft and having a clutching engagement with the driving member, a thread support on said winding head, said winding head and shaft having passages providing a thread guide leading to one end of the shaft, a traveller at said end of the shaft and means for retaining the shank of a fish hook and a snell located by the hollow shaft in substantially concentric relation to the winding on movement of the traveller.

14. In combination, a hollow shaft adapted to receive and guide the looped end of a snell, a drive member rotatable freely about said shaft, a winder head slidingly keyed on said shaft and having a clutching engagement with the driving member, a thread support on said winding head, said winding head and shaft having passages providing a thread guide leading to one end of the shaft, a traveller at said end of the shaft, means for retaining the shank of a fish hook and a snell located by the hollow shaft in substantially concentric relation to the winding on movement of the traveller and brake mechanism operable to automatically stop the winder when the same is unclutched from the drive member.

15. A snelling machine, comprising guide means for the associated portions of a hook shank and snell, a rotating traveller for wrapping a securing strand about said associated portions of a hook shank and snell, means for traversing said winding and means for automatically stopping said traverse at the end of a predetermined length of winding.

16. A machine of the character disclosed, comprising a rotary shaft having a feed screw, a stationary guide shaft parallel to said feed screw shaft, a carriage slidable on said shafts, a feed nut movably mounted on said carriage and having a handle for effecting retraction of the same from the feed screw, a chuck on said carriage and having relatively movable jaws for holding a fish hook, a steady rest having relatively movable jaws for receiving a snell and the protruding shank of a hook held in the chuck, a winder having a traveller rotating about the holding center of the steady rest jaws, drive gearing for said winder including disengageable clutch elements and trip mechanism operable by the carriage to effect uncoupling of the clutch elements and means for opening and closing the hook chuck and steady rest, one in advance of the other.

17. A machine of the character disclosed, comprising a rotary shaft having a feed screw, a stationary guide shaft parallel to said feed screw shaft, a carriage slidable on said shafts, a feed nut movably mounted on said carriage and having a handle for effecting retraction of the same from the feed screw, a chuck on said carriage and having relatively movable jaws for holding a fish hook, a steady rest having relatively movable jaws for receiving a snell and the protruding shank of a hook held in the chuck, a winder having a traveller rotating about the holding center of the steady rest jaws, drive gearing for said winder including disengageable clutch elements and trip mechanism operable by the carriage to effect uncoupling of the clutch elements, means for opening and closing the hook chuck and steady rest, one in advance of the other and brake mechanism automatically operable to effect stoppage of the winder upon the uncoupling of the clutch elements.

18. In a machine of the character disclosed, a hollow shaft, a winder having a hub portion slidably keyed on said shaft, a drive member journalled in concentric relation to said winder, said winder and drive member having cooperating clutch members engageable and disengageable in the sliding movements of the hub on the shaft, brake means engageable by the hub in the clutch disengaging movement of the same, a strand support on the winder, said winder and shaft having passages for carrying a strand out at the end of the shaft, a traveller for the strand carried by said end of the shaft, shifting means for sliding the winder hub on the shaft and guide means for aiding in positioning a hook shank and snell substantially at the center of the traveller movement.

19. In a machine of the character disclosed, the combination of separate holding devices, links for opening said holding devices, a toggle connected at its opposite ends to said links, an operating member connected with the intermediate portion of said toggle and a stop engageable by one end of said toggle to limit opening movement of one of the holders and by arresting said one end of the toggle to cause movement of the other end of the toggle to operate the other holding device.

20. A fish hook snelling machine, comprising in combination, a holder for releasably holding a fish hook with a portion of the shank protruding, means for positioning a snell in overlapping relation to the protruding portion of the hook shank, winding-on means for applying a wrapping about the overlapping portions of the hook shank and snell, means for effecting relative rotation of the hook holder and winding-on means and means for relatively traversing said winding-on means and hook holder lengthwise of the shank of the hook in the holder to thereby apply the wrapping along the overlapped portions of the hook shank and snell.

21. A fish hook snelling machine, comprising in combination, a holder for releasably holding a fish hook with a portion of the shank protruding, means for positioning a snell in overlapping relation to the protruding portion of the hook shank, winding-on means for applying a wrapping about the overlapping portions of the hook shank and snell, means for effecting relative rotation of the hook holder and winding-on means, means for relatively traversing said winding-on means and hook holder lengthwise of the shank of the hook in the holder to thereby apply the wrapping along the overlapped portions of the hook shank and snell and means for automatically discontinuing the wrapping operation at the end of a predetermined relative traverse movement of the hook holder and winding-on means.

22. A fish hook snelling machine, comprising in combination, means for releasably holding a fish hook with the shank portion of the same exposed to receive a winding, guide means for directing a winding onto the exposed shank portion of a hook held in said holding means, means for effecting relative rotation of said hook holding means and winding guide means and means for effecting relative traverse movement of said hook holding means and winding guide for carrying the winding along the exposed shank portion of the hook.

23. A fish hook snelling machine, comprising in combination, means for releasably holding a fish hook with the shank portion of the same exposed to receive a winding, guide means for directing a winding onto the exposed shank portion of a hook held in said holding means, means for effecting relative rotation of said hook holding means and winding guide means and means for effecting relative traverse movement of said hook holding means and winding guide for carrying the winding along the exposed shank portion of the hook including mechanism for automatically stopping said traverse movement on the completion of a predetermined length of winding on the hook shank.

24. A fish hook snelling machine, comprising in combination, means for releasably holding a fish hook with the shank portion of the same exposed to receive a winding, guide means for directing a winding onto the exposed shank portion of a hook held in said holding means, means for effecting relative rotation of said hook holding means and winding guide means, means for effecting relative traverse movement of said hook holding means and winding guide for carrying the winding along the exposed shank portion of the hook, said traverse means including a travelling member connected with the hook holding means for shifting the latter relative to the guide for the winding.

25. A fish hook snelling machine, comprising in combination, means for releasably holding a fish hook with the shank portion of the same exposed to receive a winding, guide means for directing a winding onto the exposed shank portion of a hook held in said holding means, means for effecting relative rotation of said hook holding means and winding guide means, means for effecting relative traverse movement of said hook holding means and winding guide for carrying the winding along the exposed shank portion of the hook, said traverse means including a travelling member connected with the hook holding means for shifting the latter relative to the guide for the winding and means for automatically stopping the movement of said travelling member on the completion of a predetermined travel of the same.

26. In a machine of the character disclosed, a carriage, a fish hook holding chuck mounted on said carriage, a steady rest for locating a snell with respect to the shank of a hook held in the chuck, a winder having a rotating traveller, said steady rest being positioned adjacent said traveller and traversing mechanism for moving said carriage and associated holding chuck relative to said rest.

27. In a machine of the character disclosed, the combination of a fish hook holding chuck, a guide for locating a snell with respect to the shank of a hook held in the chuck, a winding guide associated with the chuck, said winding guide and chuck being relatively rotatable for applying a winding about the shank of a hook held in the chuck and a snell located with respect thereto, a carriage for advancing the hook holding chuck relative to the winding guide and means for automatically effecting a predetermined feeding movement of the carriage in respect to the winding guide.

In testimony whereof I affix my signature.

LOUIS E. BALTZLEY.